No. 612,320. Patented Oct. 11, 1898.
H. J. EICHHOLZ.
PORTABLE BICYCLE STAND.
(Application filed Nov. 13, 1897.)

(No Model.) 2 Sheets—Sheet 1.

WITNESSES. INVENTOR.

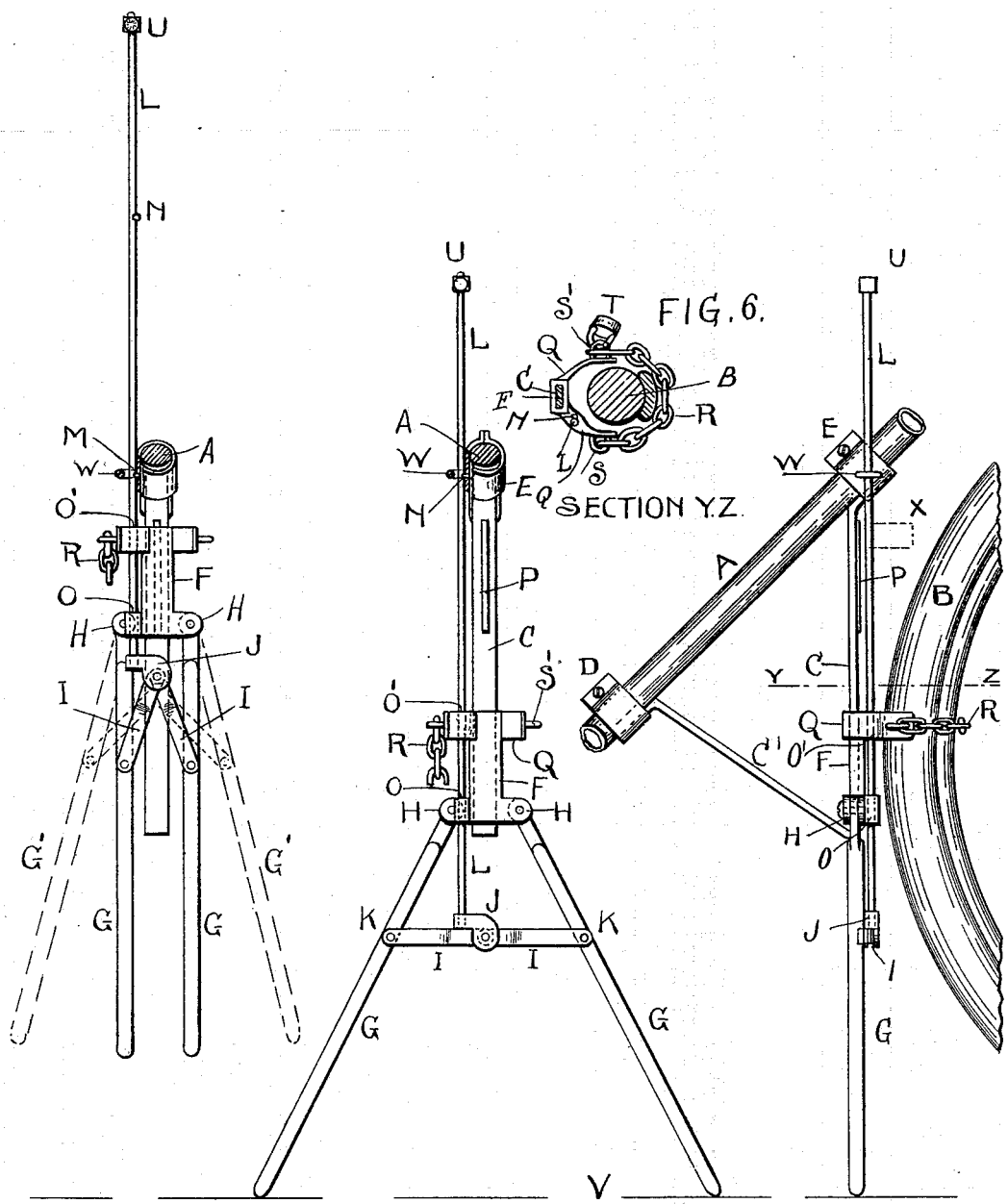

UNITED STATES PATENT OFFICE.

HENRY J. EICHHOLZ, OF ST. LOUIS, MISSOURI.

PORTABLE BICYCLE-STAND.

SPECIFICATION forming part of Letters Patent No. 612,320, dated October 11, 1898.

Application filed November 13, 1897. Serial No. 658,478. (No model.)

*To all whom it may concern:*

Be it known that I, HENRY J. EICHHOLZ, a citizen of the United States, residing at the city of St. Louis, in the State of Missouri, have invented a certain new and useful Improvement in Portable Bicycle-Supports, of which the following is a full, clear, and exact description, reference being had to the accompanying drawings, forming part of this specification.

My object has been to produce a portable bicycle-support so constructed that when fastened to the frame of any bicycle it can be operated by the rider in an instant and insure him a safe and convenient support for his bicycle no matter where he may be, thus doing away with any probable damage by accident or otherwise. I attain this object by the mechanism illustrated in the accompanying drawings, in which—

Figure 1:
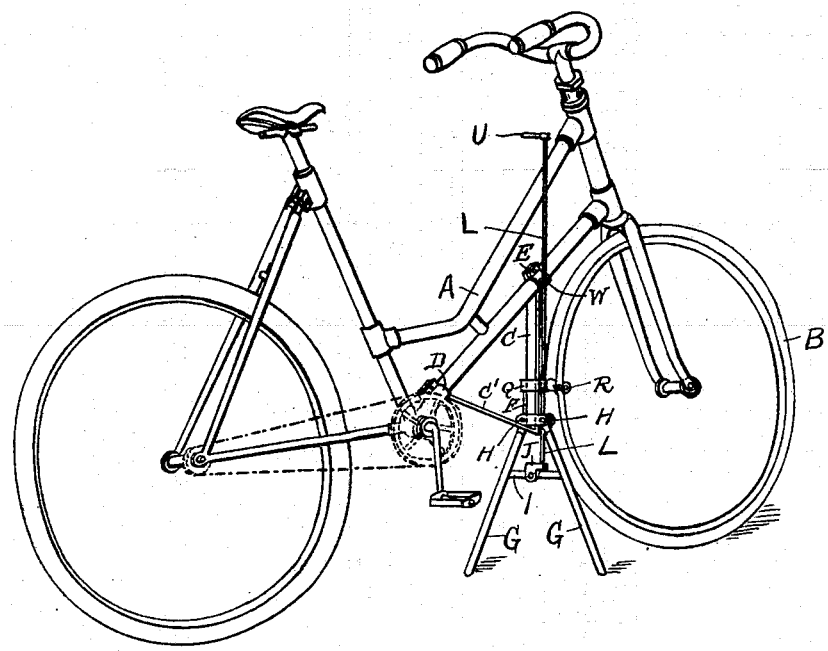
Figure 2:
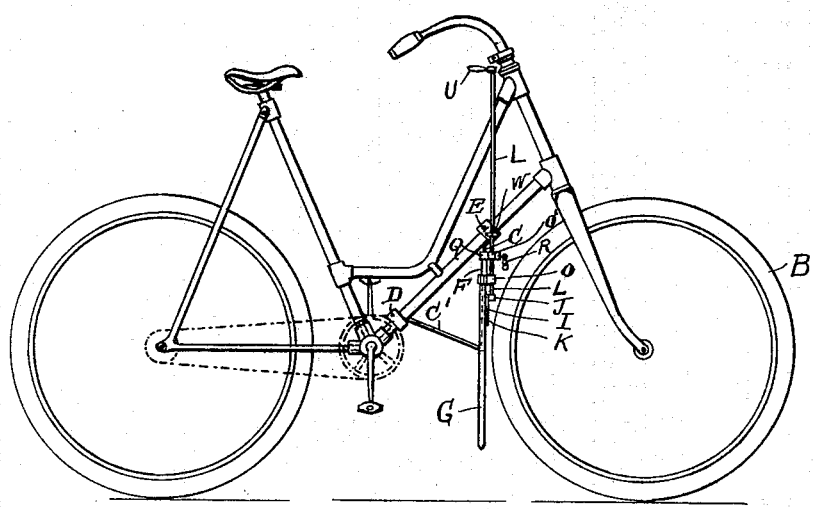

Figure 1 is a perspective view of a bicycle and my portable bicycle-support attached to same. Fig. 2 shows the side elevation of the bicycle and the bicycle with the support elevated and ready for riding. Fig. 3 shows a side elevation of the support in the position assumed when resting on the ground to support the bicycle. Fig. 4 shows a front elevation of the support as it rests on the ground, a portion of the bicycle-frame being shown in cross-section. Fig. 5 shows a front elevation of the support as it appears when raised from the ground. Fig. 6 is a sectional view, taken on the line Y Z, showing means for locking the forward bicycle-wheel.

A designates the frame of a bicycle, and B the forward wheel.

C designates a hanger-bar attached to the bicycle-frame by a clamp E, from which it is suspended. (See Fig. 3.) The lower end of the hanger-bar C is supported by an arm C', carried thereby, and connected to the frame of the bicycle by a clamp D.

F designates a slide loosely mounted on the hanger-bar C.

G are the legs of the support. They are hinged to lugs H, projecting from the slide F.

I are toggle-links hinged to the legs G at K. (See Fig. 4.)

J is a coupling that joins the links I, the links being connected thereto by a pivot-pin.

L is a lift-rod attached to the coupling J and extending upwardly and having on its upper end a handle U, so arranged as to be conveniently reached by the rider when mounted on the bicycle. The rod L passes through guides O, O', and W.

P is a spring seated in one side of the hanger C, which the slide F is adapted to ride over in sliding on the hanger for the purpose of retaining the slide by frictional contact therewith when the slide is raised to its uppermost position on the hanger.

In the clamp E is a recess M (see Fig. 5) and on the lift-rod L is a stud N, that is adapted to enter the recess M, when the support is lowered to the ground, as seen in Fig. 4, to retain the lift-rod from accidental movement.

Q designates arms projecting from the slide F. These arms are most clearly shown in Fig. 6. On the arms are eyes S and S'.

R is a chain having one end attached to the eye S, the chain being adapted to be passed around the rim of the front wheel B of the bicycle when it is desired to secure the said front wheel from movement to prevent the riding of the bicycle. The chain being passed around the rim of the wheel B, it is secured to the eye S' by a padlock T or other suitable fastening.

In the use of my improvement the parts are operated in the following-described manner: When the support is not in use, to sustain the bicycle to which it is attached the parts are raised into the folded position shown in Figs. 2 and 5. When the device is in use, to sustain the bicycle the parts are in the position shown in Figs. 1, 3, and 4. With the device elevated, as shown in Figs. 2 and 5, the support-legs are drawn inwardly and the slide F is in an elevated position on the hanger C, where it is retained through frictional contact of the spring P with said slide. When it is desired to lower the support, so that the legs G will be brought in contact with the ground to sustain the bicycle, the lift-rod L is pushed downwardly by the rider grasping the handle U at the upper end thereof, and the downward movement of the lift-rod causes the legs G to be first thrown outwardly by reason of the rod acting on the coupling J to force the inner ends of the toggle-links I downwardly and their outer ends outwardly. After the legs G have been spread on the downward travel of the rod L a continued movement of the rod causes the slide F to be carried downwardly until the legs G reach the ground, where they brace the bicycle from toppling to either side. When it is desired to raise the legs from the ground, the reverse movement of the parts is obtained by drawing the lift-rod L upwardly.

It will be seen that the parts are so arranged that the device may be readily operated by a bicycle-rider while seated on the saddle thereof, so that he may readily manipulate the support into either position while seated on the vehicle, or at his option may operate the device while dismounted. By referring to Figs. 1 and 3 it will be seen that the arms Q are carried down to a position where they will straddle the rim of the forward bicycle-wheel when the support is lowered to the ground. By this arrangement the forward bicycle-wheel is securely held parallel with the rear wheel of the bicycle.

When it is desired to secure the forward wheel of the bicycle from movement to prevent the vehicle from being ridden, the chain R is passed around the rim of the forward wheel, as described, and secured by the padlock T or other suitable means of fastening.

I claim as my invention—

A bicycle-stand comprising a clamp having a rod-guide, a pendent bar, a slide having arms and rod-guides, the legs pivoted to the slide, the links pivoted to the legs, the coupling connecting the links, and the lift-rod connected with the coupling and extending through the rod-guides, substantially as described.

HENRY J. EICHHOLZ.

Witnesses:
JOHN J. MEYER, Sr.,
L. W. BLANKE.